March 28, 1967 W. A. NICHOLS ETAL 3,311,317

AUTOMATIC TAPE WINDER

Filed Nov. 23, 1964 2 Sheets-Sheet 1

WILLIAM A. NICHOLS
RALPH E. SIMPSON
INVENTORS

BY John H. Crowe
AGENT

AUTOMATIC TAPE WINDER

Filed Nov. 23, 1964 2 Sheets-Sheet 2

WILLIAM A. NICHOLS
RALPH E. SIMPSON
INVENTORS

BY John H. Crowe
AGENT

United States Patent Office 3,311,317
Patented Mar. 28, 1967

3,311,317

AUTOMATIC TAPE WINDER

William A. Nichols, 5617 Hawthorne, and Ralph E. Simpson, 9815 Monte Vista Ave., both of Montclair, Calif. 91763

Filed Nov. 23, 1964, Ser. No. 412,969
11 Claims. (Cl. 242—67.1)

This invention relates to means for automatically winding perforated tape, and more particularly to such means adapted primarily for automatically threading and winding perforated tape of the type used for programming the operation of Linotype or Intertype linecasting machines.

As those skilled in the art of newspaper composition are aware, linecasting machines (originally designed and built solely for manual operation) have in recent years been increasingly converted to automatic operation capability by the installation of a tape-controlled device known commercially as the Teletypesetter Operating Unit (hereinafter referred to as the Operating Unit, or simply Unit), a product of Fairchild Graphic Equipment, Division of Fairchild Camera and Instrument Corp., Plainview, N.Y., which attaches directly to the keyboard of such a machine. Once a linecasting machine is so equipped, it can be converted from manual to automatic operation, or vice versa, simply by turning a tape feed control lever on the Operating Unit. The tape fed to the Operating Unit is of a specially prepared type having coded perforations, the function of the Unit being to "sense" these combinations and translate them into mechanical actions which automatically operate the linecasting machine.

The perforated tape which controls the Operating Unit is prepared from blank paper tape of suitable type by means of a Teletypesetter Perforator, an instrument manufactured and sold by the company that produces the Operating Unit. The Teletypesetter Perforator (hereinafter called the Perforator) is equipped with a fast keyboard and a mechanism cooperating therewith to punch code symbols comprising from one to six holes each, along with center tape feed holes, in the tape. No detailed discussion of the anatomy or mode of operation of Perforators is here felt necessary, but a cursory knowledge of the manipulaive particulars of routing and processing the tape through the Perforator, as presently accomplished, and of processed (coded) tape winding procedures of present day use will, it is believed, be helpful to an understanding of the nature of, services performed by, and advantages over presently known tape winding means possessed by the tape winder of this invention. For these reasons, a brief discussion of the relevant aspects of the Teletypesetter method of tape production (so called by Fairchild) in which coded tape copy is prepared on a Perforator and thereafter fed to an Operating Unit on a linecasting machine for automatic control of the latter, appears below.

Several Perforator models are suitable for use in the Teletypesetter method of type production, examples being the Standard Perforator, the Standard Light Touch "1000" Perforator, and the Multiface Light Touch "1035," to use the manufacturer's model names. To avoid confusion, the term "Perforator" will hereinafter, unless expressly modified, be used in an alternatively inclusive sense to denote any model of the instrument within the above-indicated group. The Perforator is equipped with a tape reel container for housing a reel of blank paper tape; a punch block for perforating the tape; cooperating means for moving and guiding the tape from its reel in the tape reel container past the punch block and out of the Perforator; a backspace lever for permitting tape backspacing for error correction or other reason; and additional structural hardware, of no presently pertinent significance, for controlling or effecting the movement of the tape. From the punch block, the perforated tape is routed to an accessory tape winder, operated by a key-wound spring motor. The tape winder has a plunger knob for manually starting and stopping it, and a stop lever which automatically stops the winder when the tape becomes taut.

The aforesaid tape winder has a reel comprising front and back plates separated by four slotted mounting posts, the posts being so sized and spaced as to hold the plates apart the proper distance to admit the tape therebetween and to serve as a reel frame around which the tape winds. The recommended procedure for threading tape into the tape winder involves the steps of removing the front plate, passing the tape under the stop lever and through one of the slotted mounting posts of the winder, then replacing the front plate. The stop lever is mechanically interlinked with the inner works of the tape winder in such a way that its upward movement a fractional distance by tautening of the tape causes shutdown of the winding mechanism and consequent stoppage of the winder. Increasing tautness can be the result of Perforator malfunctioning, or other difficulty, but regardless of its causation, the necessity of a safety control, such as the aforesaid stop lever, on a tape winder insensitive to the performance fluctuations of a Perforator (as is that under present consideration), to prevent continued winding after tape production ceases, is apparent. It should be noted that the tape winder must be positioned so that its reel is properly aligned with the advancing tape copy from the Perforator.

The blank tape is driven through its coding treatment in the Perforator with an intermittently halting, rather than a steady movement. This permits the tape to stop momentarily for each code character perforation, blank space registration, or the like, and then move on to expose its next increment for proper code treatment. The alternating sequence of tape jumps and pauses just described is accomplished by means of a pawl and ratchet drive, not necessary to discuss in detail here. A thumb wheel coactive with the pawl and ratchet drive means, affixed to a coaxial stem projecting through an opening in, or cutaway portion of, a metal cover for the Perforator punch block, is so positioned as to rotate planarly parallel to the direction of travel of the tape. The purpose of the thumb wheel is to permit manual control of the tape drive means for tape feeding, backing, etc., manipulations where necessary in the operation of the Perforator. However, because of the coactive relationship between the thumb wheel and tape drive means, the former moves in unison with the latter during normal operation of the Perforator. The possibility of somehow utilizing the energy of the moving thumb wheel to drive a winder for the perforated tape has never, to our knowledge, been fulfilled, probably because of the practical difficulty of converting the jerky stop-and-go motion of the thumb wheel to a smooth, steady movement suitable for tape winding purposes. Our invention, however, as will be seen, affords a means of harnessing this heretofore wasted thumb wheel energy for tape winding purposes.

While the presently existing means of winding perforated tape serves the purpose reasonably well, it has certain inherent shortcomings. For one thing, the manual threading of tape thereby entailed is a somewhat unwieldy procedure. For another, the obvious lack of mechanical correlation between the Perforator tape driving and separate tape winding systems creates the necessity of an automatic safety control to guard against the consequences of continued winding of the tape after failure or malfunction of the Perforator. Also, it is difficult to back up the tape in the Perforator, once it has entered the tape winder, because of the resisting spring pressure in the winder. Since the tape must be forceably backed against the resistance of the winder spring, there is a tendency for its feed holes (describel later) to tear in the process. By the use of our invention, however, tape backing is readily accomplished without these difficulties. Moreover, there is substantially no tape alignment problem connected with the backing of the tape wound as taught herein, whereas tape alignment must be adjusted almost to perfection for backing from presently used winding equipment.

It is thus a principal object of the present invention to furnish means for automatically threading and winding perforated tape from a Perforator.

It is another object of the invention to furnish such means having drive means sensitive to the performance of the Perforator tape driving means.

It is still another object of the invention to furnish such means permissive of reverse direction tape movement in the Perforator without the difficulties presently attendant upon such movement.

Other objects, features, and advantages of the invention will become apparent as the description thereof proceeds.

The winding means of this invention, and its method of operation, will be better understood by reference to the accompanying drawings, of which:

Figures 1, 2, 3, 4:
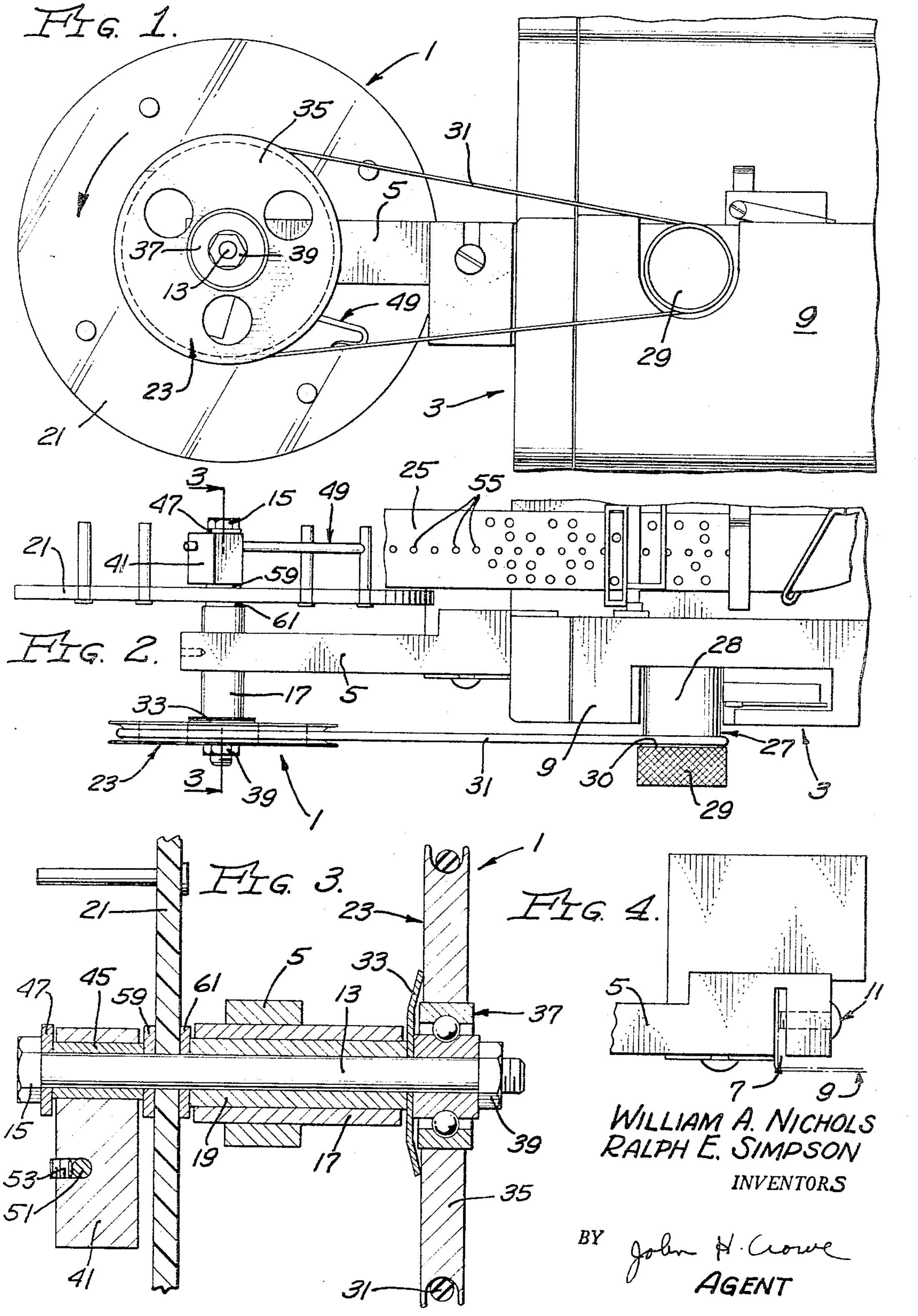
FIGURE 1 is a front elevation of a preferred embodiment of an automatic tape winder in accordance with the invention, attached to a Perforator in drive relationship, showing belt drive means of transmitting energy from the Perforator thereto.
FIGURE 2 is a top view of the FIGURE 1 tape winder, showing its belt drive connection with the Perforator and the advancing end of a length of perforated tape leaving the Perforator.
FIGURE 3 is a transverse section through the tape winder, taken along line 3—3 of FIGURE 2.
FIGURE 4 is an enlarged, fragmentary top view of the tape winder, showing only enough to illustrate its manner of support, this being by bracket attachment to a wall of the Perforator punch block cover, and showing a portion of the aforesaid punch block cover in phantom outline.

Considering now the drawings in greater detail, with emphasis first on FIGURES 1 through 4, there is shown an automatic tape winder 1 attached to a Perforator 3 by means of an elongated bracket 5. Bracket 5 has a deep slot 7 near one end, said slot being adapted to admit the edge of a Perforator punch block cover 9. Bracket 5 is fastened in place on punch block cover 9 by a couple of set screws, one being shown at 11 in FIGURE 4, the other being hidden from view behind the one shown. The dimensions and configuration of bracket 5 and its slot 7, as well as the location of the slot in the bracket, are all such as to assure proper orientation of the winder 1 with respect to Perforator 3 and the route of the perforated tape as it leaves the Perforator. The particular way in which winder 1 is attached to Perforator 3 by means of bracket 5 and slot 7 is well illustrated in the drawings, particularly FIGURES 2 and 4. It should be pointed out, however, that the pictured bracket support means is adapted for use with Perforators having a punch block cover designed to accommodate it, and that other Perforators will require brackets differing in some way from, or adaptors for, bracket 5, in order to assure proper support and orientation of the tape winding device. For example, to meet this problem in the case of one particular Perforator, we have attached an adapter to bracket 5, so sized and configured as to fit flat on the top of the Perforator punch block cover and so apertured as to permit its fastening by means of existing tapped holes in the punch block. Neither this expedient, nor any other necessary for the proper fastening of our winder to any tape perforating machine poses a problem requiring more than ordinary skill of the routineer in the art, in the light of present teachings, for its design and use.

Returning now to consideration of the drawings, tape winder 1, it will be noted, has a central shaft 13 disposed horizontally and at right angles to bracket 5. Shaft 13 has a bronze bushing 19 press-fitted thereon which is journaled in a spacer sleeve in a hole in the bracket in the below-described manner. Shaft 13 is a partially threaded bolt with a hexagonal head 15, but any type of shaft capable of serving the purpose can be used in lieu thereof within the scope of our invention. As FIGURE 3 shows particularly well, bracket 5 supports shaft 13 at about its midpoint. As indicated above, the opening in bracket 5 through which shaft 13 passes has a spacer sleeve 17 force-fitted therein, in which bushing 19, and coactive shaft 13, ride when the tape winder is in operation. Spacer sleeve 17, bushing 19 and shaft 13 are, of course, in coaxial relationship, and, for reasons later made clear, the bushing is slightly longer than the sleeve.

Disposed concentrically around shaft 13 are a reel disc 21 and a pulley 23, the former in back of bracket 5 (that is, on the part of the shaft nearest the path of exit of coded tape copy, shown at 25, from Perforator 3) and the latter in front of the bracket and aligned with an exposed strip 27 around the outside of the stem 28 of a thumb wheel 29 on Perforator 3. The exposed strip of thumb wheel stem is physically bounded by an inner shoulder 30 of thumb wheel 29 on one side and punch block cover 9 (through which stem 27 passes) on the other. These barriers serve to keep an O-ring belt 31 riding therebetween, and thus, in conjunction with exposed strip 27 of stem 28, serve the purpose of a drive pulley groove. The manner of installation of O-ring belt 31, and its function and purpose, will be discussed in detail below.

Reel disc 21 is a flat, circular plate, made of Plexiglas, having a concentric hole through which shaft 13 passes. When in service, winder 1 is so assembled and held together that reel disc 21 revolves coactively with the turning of shaft 13. Pressed rearwardly through four tight-fitting holes in reel disc 21, the holes being of equal radial distance from the center of the disc and equiangularly spaced thereon, are four reel pins, *a*, *b*, *c* and *d*, respectively, which serve as a reel frame around which tape 25 winds. Reel pins *a*, *b*, *c* and *d* are round, flat-head rivets, and the annular inner facts of their heads lie flush with the front surface of the reel disc, all as illustrated in the drawings, especially FIGURES 2 and 3. Further discussions of the reel pins, and a description of the other elements of the winder deposed rearwardly of reel disc 21 along shaft 13 are postponed pending completion of the description of the winder drive means.

As previously indicated, one of the advantages of our winder is its capability of harnessing the intermittent motive power heretofore wasted in Perforator thumb wheel movements, and utilizing this for tape winding purposes. Thus, not only is waste energy made available for a useful purpose but perhaps more importantly, tape copy processing and tape winding operations are, as a result, made to perform synchronously. The importance of the latter will be evident when it is realized that any malfunctioning of the Perforator resulting in slowing or sudden stoppage of the tape processing operation is, as a consequence thereof, accompanied by a slowing or stopping of the tape winding operation. Thus, of course, insures against any damage which may otherwise occur were tape winding to continue the normal rate after the malfunctioning.

The Perforator thumb wheel energy is tapped and utilized for operation of our tape winder by means of O-ring belt 31 which, as the drawings show, drivingly connects exposed strip 27 of thumb wheel 28 and pulley 23. O-ring belt 31 (hereinafter called belt 31) is made of neoprene, or other resilient material, and is of such size as to link the thumb and wheel stem and pulley with sufficient tension to serve the power transmission requirements of this invention. We believe the resiliency of the neoprene, or equivalent material, plus the fact, not heretofore mentioned, that our drive system is designed to permit belt slippage under power surge conditions (a feature inherent in the system but exploited for optimum effect by judicious selection of belt size and other design particulars), have the combined effect of damping the energy surges induced by the stop-and-go oscillations of the thumb wheel stem during the transmission of mechanical energy therefrom to pulley 23 by the belt. In any event, we have discovered that power delivered by means of our drive system yields a smooth, continuous winding action, rather than a series of alternating starts and slowdowns simulative of the ratchet-controlled thumb wheel stem movement.

Pulley 23 is separated from the front end of bonze bushing 19 by a relatively short strip of thin spring steel 33 fitted tightly on shaft 13 around a hole in its middle. Spring steel strip 33 is bent slightly along two substantially parallel, transverse lines spaced equidistantly from the shaft. The directions of bend of the spring steel strip are such as to give it a somewhat blow-like shape, the arch of the bow being tightly held between the end of bushing 19 on one side and the hub (which, as will later be seen, in the inner race of a ball bearing) of pulley 23 on the other. The two ends of the spring steel strip bow bear against the inner face of pulley 23. Pulley 23 encircles the threaded end of shaft 13, and drawn tightly against the outer face of its hub is a nut 39 locking it against the two ends of steel strip 33 abutting its inner face. Pulley 23 has an annular outer portion, or annulus, 35 encircling a ball bearing 37 concentrically inset therein. Ball bearing 37 is friction-fitted to shaft 13 and its inner race forms the hub, previously alluded to, of pulley 23. The inner race of ball bearing 37 is slightly wider, in its axial dimension, than the remaining portion of the bearing or the annular outer portion of pulley 23. As a result, when nut 39 is tightened against the outer face of the inner race of the bearing, its inner face bears against spring steel strip 33 and keeps the strip, except for its bent end portions, slightly separated from the other parts of pulley 23.

Spring steel strip 33 is sufficiently long for its ends to contact the inner face of pulley 23 at points radially beyond the periphery of the outer race of ball bearing 37. As a result, pulley 23 is provided with a slip clutch safety mechanism whereby unexpected resistance to continue rotation of the tape reel, such as might occur if the tape winding were to exceed the tape feed rate, permits outer ring 35 of the pulley to continue its rotation under the driving influence of belt 31 without any damage to tape or equipment. By virtue of the coactive relationship between shaft 13, bushing 19 spring steel 33 and the inner race of ball bearing 37, any force sufficient to prevent rotation of shaft 13 would, were it not for the slip clutch arrangement, be a source of potential trouble when pitted against the driving force delivered by belt 31.

For successful operation of our slip clutch assembly, there must be adequate spring pressure in the ends of spring steel strip 22 abutting the inner face of pulley 23 to transmit rotational energy from the pulley, through the spring steel strip, to shaft 13, and ultimately, to reel disc 21, but not enough pressure to prevent slippage between the inner pulley face and the ends of said spring steel strip when opposing forces are conflictingly through the pulley and steep strip. When this optimum quantum of spring pressure, which anyone skilled in the art can easily achieve with the benefit of present teachings, is present, the binding of shaft 13 against rotational movement for any reason while belt 31 continues to deliver motive power to pulley 23 result in the continued rotation of annulus 35 of the pulley in slipping contact with the ends of spring steel strip 33. When this occurs, the outer annular portion of the pulley rides around the inner race of ball bearing 37 on the intermediate steel balls. From the foregoing explanation, it will be apparent that nut 39, when tightened against the inner race of ball bearing 37 in the described manner, can never interfere with the rotation of annulus 35 of pulley 23.

Considering now the remaining elements of the illustrated embodiment of our invention, these are all disposed rearwardly of reel disc 21 along central shaft 13. Central shaft 13, it will be noted, protrudes from a close-fitting hole in the center of reel disc 21 a distance sufficient to accommodate an aluminum block 41 strung thereon in freely swinging relationship. Aluminum block 41 serves as a weight for the positioning of a relatively long-shanked hook 49, attached thereto in the manner hereinafter described.

Aluminum block (hereinafter referred to as weight) 41 has a straight hole through it, near one end. The hole is of round bore and so sized as to receive a bronze bushing 45, force-fitted onto shaft 13, in sufficiently loose fitting tolerance to permit free swinging suspension of weight 41 on the shaft. Bushing 45 is, for reasons later made clear, slightly longer than its receptive hole in weight 41. A snug fitting washer 47 is pressed onto shaft 13 (which, as previously pointed out, is really a threaded bolt) to abutting relationship with its hexagonal head. Two washers, 59 and 61, similar to washer 47, flank reel disc 21 on shaft 13. The purpose of the pair of washers is several-fold. For one thing, they serve as a hub of sorts. They also help to properly space reel disc 21 on shaft 13, and maintain it in perpendicular relationship with respect thereto. Finally, the disc flanking washers serve as buffers to help prevent direct contact between the rotating faces of the reel disc in action and the end of spacer sleeve 17 on one side and weight 41 on the other side of the disc.

As will by now, no doubt, be apparent, assembly of our pictured winder embodiment and the tightening of nut 39 yields a tightly locked structure, without looseness or slackness except where journaled to permit free rotation of the shaft 13 and its coactive parts in holding bracket 5 and with respect to suspended weight 41. More specifically, the tightening of nut 39 locks, in the order in which they appear from left to right on FIGURE 3 which illustrates our locking principal particularly well, washer 47 against hexagonal head 15 of shaft 13; bushing 45 against washer 47; washer 59 against bushing 45; reel disc 21 against washer 59; washer 61 against reel disc 21; bushing 19 against washer 61; spring steel strip 33 against bushing 19; the inner race of ball bearing 37 against spring steel strip 33; and, finally, nut 39, itself, against the inner race of the ball bearing. All of these tightly locked parts revolve as a unit, consistent with the herein-described manner of functioning of our winder. As will now be clear, bushings 19 and 45 are slightly longer than their respective bearing holes in spacer sleeve 17 and weight 41 to permit the necessary above-described locking engagement between the ends of the bushings and the flanking elements between which they are sandwiched on shaft 13, without binding spacer sleeve 17 or weight 41 against those elements. FIGURE 3 illustrates the here-involved dimensional relationships as well as the above-discussed locking ones.

The relatively long-shanked hook 49 is fastened in place, with its shank passing through a loose fitting hole 51 in weight 41, by means of a set screw 53 tightened in a matingly threaded hole in the weight which intersects hole 51 at right angles thereto. The dimensions and orientation of hook 49 and the positioning of hole 51, as well as the tapped hole for set screw 53 in weight 41, all cooperate to cause the resulting hook-weight assembly to hang in the position of counterbalance shown in FIGURE 5. As that figure illustrates, hook 49 in its counterbalance position hangs with its crook in the direction of the Perforator, the crook first curving downwardly, then back in the direction of weight 41, and finally bending, near its tip, slightly outwardly away from the shank of the hook. The tip of the hook is sharpened to some extent, for reasons set forth hereinafter, but is not so pointed as to create a danger of one's pricking his fingers, piercing the paper tape copy, etc., when using the winder.

Hook 49 is so oriented and positioned relative to the route of the processed tape leaving the Perforator (hereinafter all coded tape will be referred to, for simplicity's sake, as tape copy 25, or simply tape copy) as to place it in alignment with, and its out-turned tip directly over, the feed holes of the tape copy entering the reel frame of the winder. The feed holes, as illustrated at 55 on FIGURE 2, form a continuous line of perforations in the center of the tape, and are properly spaced to mesh with the pins on a so-called feed wheel in the Perforator. While, as will be seen, we make good use of the tape feed holes in the practice of our invention, the existence of the holes in tape copy has long been known and need not be further discussed here. The manner in which hook 49 is aligned with the feed holes of the tape copy is well illustrated in FIGURE 2.

As will by now be clear from the drawings and above description thereof, winder 1 is so positionally oriented with respect to Perforator 3 and its outpouring tape copy that the copy is steered into the winder free of twist and properly aimed for kink-free winding around reel pins *a*, *b*, *c* and *d*. The projecting distance of hook 49 from weight 41 is such as to permit clearance of reel pins *a*, *b*, *c* and *d* with relatively close tolerance as the hook-weight assembly swings freely around shaft 13. These dimensional and other relationships are well illustrated in FIGURES 1, 2, 5, 6 and 7.

Figure 5:
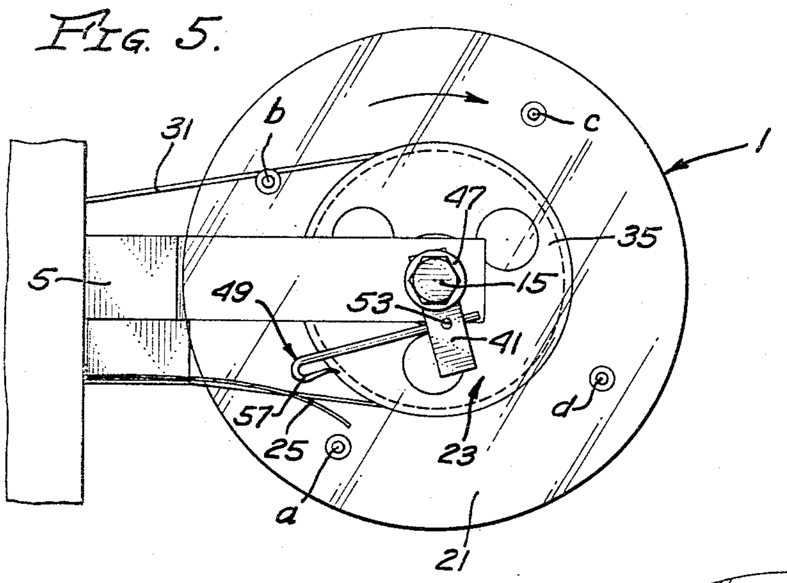
FIGURE 5 is a back elevation of the FIGURE 1 winder, attached to a Perforator in operation, and showing the advancing end of perforated tape from the Perforator entering its tape threading zone.
Figures 6, 7:
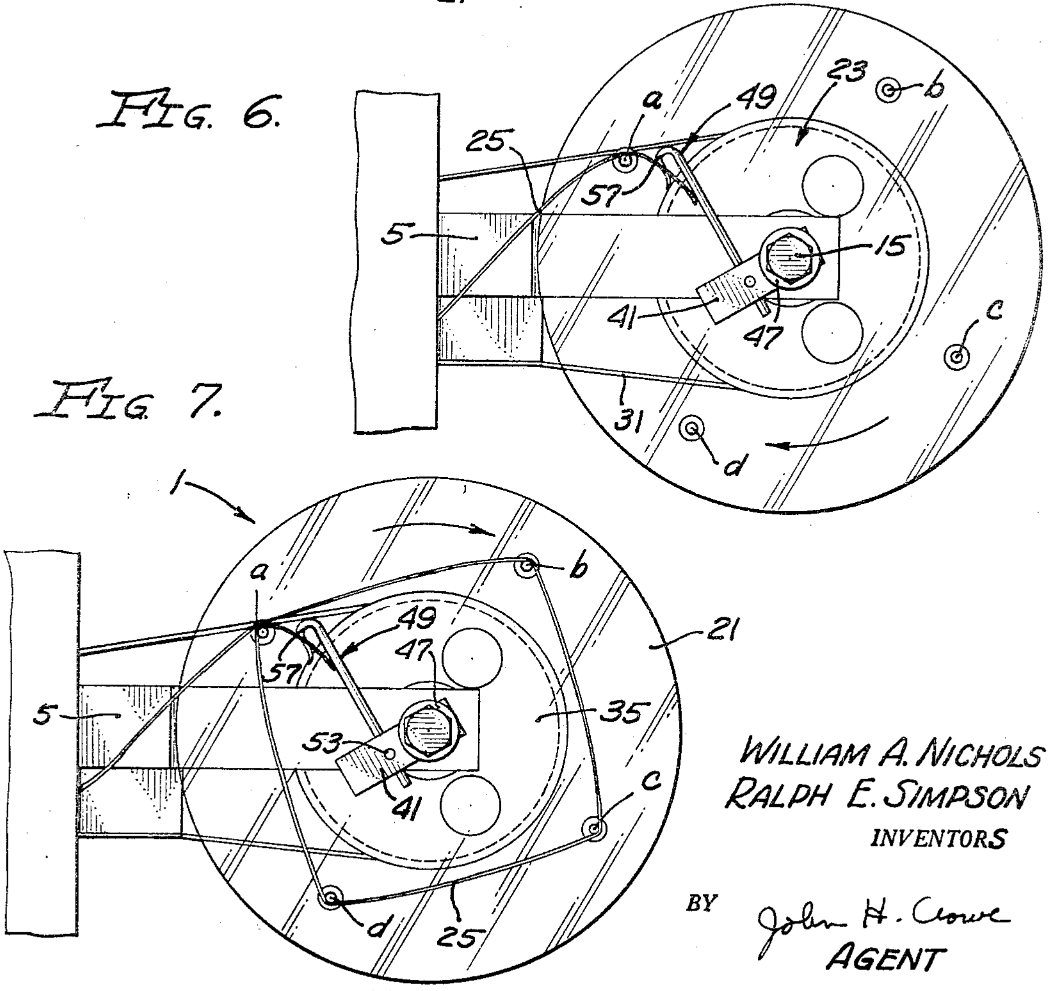
FIGURE 6 is a view similar to the FIGURE 5 view, but taken at a point later in time to illustrate the automatic threading action of the winder.
FIGURE 7 is a view similar to the FIGURE 6 view but taken at a still later point in time to illustrate the tape winding action of the winder after the tape has been automatically threaded.

The manner in which our novel device accomplishes its tape threading and winding functions is believed apparent from FIGURES 5, 6 and 7, which illustrate successive phases in the normal functioning of the device. FIGURE 5 is a back view of our winder in operation, showing its winding reel and threading mechanism (hook-weight assembly) in receptive readiness as the end of tape copy 25 from Perforator 3 approaches for functional engagement therewith. As the winder is viewed in FIGURE 5, its reel is rotating in a clockwise direction and the end of tape copy 25 has entered the reel frame between reel pin *a* and the curved end, or crook, of hook 49. Pin *a* continues its clockwise orbit around the axis of shaft 13 from its FIGURE 5 position, and shortly contacts the underside of tape copy 25, which by then has increased in length to yield more slack, permitting it to ride up and over the pin as the latter moves upward along its circular path. This causes the ever-lengthening ribbon of tape copy to soon reach a point of contact with the lowermost arcuate segment 57 of the crook of hook 49 and thereafter, by virtue of the upward travel of the tape under the propulsion of reel pin *a* and its steady increase in length, as well as the angle of hang of the hook, the tape copy forces the contacted part of hook 49 to travel with it, thereby causing the whole hook-weight assembly to swing freely, in the direction of rotation of reel disc 21, around shaft 13.

As tape copy 25 continues to move under the urging of reel pin *a*, the arcuate segment of the crook end of hook 49 initially in contact therewith turns cam-like on the tape until the slightly out-turned tip of the hook is brought close to the tape copy, after which the tip automatically works itself into one of the feed holes in the tape and hooks, or threads, it for subsequent winding around reel pins *a*, *b*, *c* and *d*. This automatic hooking or threading action is well illustrated in FIGURE 6, which shows the tape just after the tip of hook 49 has found its way into a feed hole. We have discovered, as a result of countless trial runs with, as well as prolonged usage of, tape winders similar to that of the drawings, that the above-described threading action occurs repeatedly, with substantially no incidence of failure, in the practice of our invention. For best results, the tip taper and other configurational features of hook 49 should be such as to assure only shallow insertion of the hook tip in the tape copy feed hole. An optimum depth of hook tip insertion is illustrated in FIGURES 6 and 7.

After the tape copy 25 is automatically threaded by hook 49 in the indicated manner, the continued orbital travel of reel pin *a* about the axis of shaft 13 maintains sufficient tension on the tape to prevent the tip of the hook from leaving the feed hole in which it is caught. Because of the free swinging relationship of the hook-weight assembly about shaft 13, tape copy 25 now pulls the snagged hook after it as reel pin *a* continues in its circular travel path. The forces thus set in motion cause the tape copy to wind itself around the reel frame formed by the four reel pins *a*, *b*, *c*, and *d*. FIGURE 7 demonstrates this winding action by depicting the winder and tape copy as it appears one complete revolution of the reel frame after the FIGURE 6 stage of proceedings.

The reach of our invention, from the standpoints of function and structure, will be apparent from the foregoing description of the drawings. More importantly, one skilled in the art would have no difficulty in constructing and using a tape winder (within the scope of the invention) from the discussion in conjunction with the drawings. It should perhaps be noted, in this connection, that reel disc 21 must turn at such a rate as to receive tape copy slightly faster than it is being produced, to keep the tape taut during winding. This is accomplished primarily, as implicitly evident from the above teachings, by proper pulley ratio adjustment in the drive system and the use of a slip clutch, such as that shown in the drawings, in conjunction therewith. This type of drive setup, as previously indicated, permits the Perforator operator to back up the tape without undue drag from that already wound on the reel frame. The explanation is that, once reversed, the tape is fed back into the Perforator at a slightly higher rate than its normal forward movement, thus avoiding the possibility of tape tension in the punch block and consequent danger of "stripping" the feed holes in the copy.

The various structural elements of our tape winder can be of any size and material suitable for the purpose. Preferred or optimum sizes and materials are matters of easy selection by those skilled in the art, using the present disclosure as a guide. However, to give some idea of what we have found to be especially good in the way of design hardware, a list of parts of a winder we have constructed and used often, with excellent results, on both the Standard Perforator and the Standard Light Touch "1000" Perforator, is set forth below. For simplicity's sake, the parts in the following list will be designated by the numerals used to identify their respective counterparts in the accompanying drawings:

| Part | Material of Manufacture | Size |
|---|---|---|
| Reel Disc 21 | Plexiglas | 4¾" dia. x ⅛" thick. |
| Reel pins a, b, c, d | | .120" dia. x ¾". |
| Hook 49 | | .0935" dia. x 2¼". |
| Weight 41 | Aluminum | 9/16" wide x 1¼" long x ⅜" thick. |
| Pulley 23 | Plastic-impregnated fiber. | 2½" dia. x ¼" thick. |
| Ball bearing 37 | | Torrington PN-3. |
| Shaft 13 | Steel | .189" dia. x 2½". |
| Bushing 19 | Bronze | .3975" O.D., 3/16" I.D. x 1 3/16" long plus .008". |
| Spacer sleeve 17 | Steel | .550" O.D., .399" I.D. x 1 3/16" long. |
| Bushing 45 | Bronze | .250" O.D., 3/16" I.D. x 19/32". |
| Spring steel strip 33 | Spring steel, blued | .006" x 1" x 1". |
| Nut 39 | | Hex head 10-32. |
| Belt 31 | Periflex 5043/50 | O-ring, 12" cir. |
| Set screw 53 | | 8-32 x 3/16" Allen set screw. |

The above parts list is not complete but is believed adequate for the purpose, this being to give a feel for the size range of our winder units. While the unit can be of any suitable size, the above-listed parts are for a winder designed for service with a Perforator, the use of widest applicability insofar as presently contemplated. It will be noted that spring steel strip 33 in the above list is not a "strip" at all, as is its drawing counterpart, but a square piece of spring steel. This illustrates the fact, later emphasized, that the pictured embodiment of our winder is merely illustrative of a preferred form thereof and by no means limitative insofar as the particular winder element sizes and configurations are concerned. The invention, of course, includes within its scope all elements equivalent to those shown in the drawings and, in line with this, spring steel strip 33 can be replaced by a piece of spring metal of any peripheral shape (square, round, or otherwise) and bent in any fashion, so long as it serves its slip, or friction, clutch function. The reason for the inconsistency in the shape of spring steel strip 33, between the above list and the drawings, is, of course, that the list reflects a winder model slightly different from that of the drawings.

We have heretofore emphasized the use of our winder for handling perforated tape copy of the type prepared and used in newspaper composing rooms for the automatic operation of linecasting machines. In the same connection, special emphasis has been placed on the applicability of the winder for the automatic winding of tape copy from a Perforator. It should be clearly understood, however, that the use of our winder is not so limited and that it can be employed for the threading and winding of perforated tape from any source, regardless of the end use of the tape. Thus, perforated tape from a machine other than one of the Fairchild Perforators can be wound within the scope of our invention if our device is so positionally supported as to properly receive the tape for threading and winding purposes. Perforated tape-controlled machine shop and manufacturing operations such as drilling, milling, boring, tapping, reaming and turning operations are becoming more and more prevalent and coded tape has been a familiar working tool to computer technicians for a relatively long period of time. In addition, banks, police departments and telephone companies now have occasion to use perforated tapes in various phases of their operations. Perforated tape intended for any of the foregoing, or other, applications can of course be handled by a winder within the scope of our invention where the tape movement lends itself to the involved automatic threading and winding treatment.

Our automatic tape winder is not limited, in service, to the winding of conventional paper tape, such as that heretofore exclusively considered, but it may be used to thread and wind any ribbon-like tape or film bearing perforations suitable for the hook threading technique of our invention. The thread cooperating perforations need not be center holes, such as the feed holes in Perforator tape copy, but may be anywhere in the tape, it being necessary only that the tape and hook be so spatially oriented that the tip of the latter can unerringly find a hole when the hook is finally jockeyed into mating proximity to the tape.

Our novel tape winder, as will be apparent from the foregoing description, is actually a combination of two mechanical subcombinations, each, in our opinion, of patentable merit. The subcombinations are: (1) the winder drive system, which is applicable for the transmission of motive power from a pawl and ratchet driven wheel or equivalent mechanical power source to any cooperating system requiring a pulse-free power input such as, for example, a tape winding reel of a type other than ours, and (2) the automatic threading and winding mechanism of our winder, which can be driven by a power system other than the one taught herein and identified as subcombination (1). Illustrative of both the bifurcated nature of this invention and its range of usefulness is the fact that the pictured embodiment of our winder can be employed for rewinding Perforator-coded tape after its passage through an Operating Unit on a Linotype or other linecasting machine. When it is used for this purpose, the power source for the drive system is not a Perforator thumb wheel drive, but a separately provided motor or the equivalent.

There are numerous modifications of the drawing-embodiment of our winder within the scope of the present invention, such modifications being those incorporative of noncritical structural variations. Many such structural variations have already been referred to herein and many others will occur to those skilled in the art. Exemplary of the latter variations are those involving the hook or hook-weight assembly of the winder, in which connection we have experimentally determined that a hook similar to hook 49 but without the out-turned tip performs almost equally as well, for our purpose, as does one with the hook 49 configuration. Also, we have proved that the hook can differ substantially in shape, size and position relative to the reel pins, from the drawing-illustrated embodiment of same, and still adequately perform its function. The weight can vary considerably in material, size, shape and manner of free swing suspension, from weight 41, and still perform satisfactorily. For one thing, the hook can have a ball bearing free float suspension system in lieu of the pictured bushing arrangement, if desired, within the scope of the invention. All that is required in the hook-weight assembly is that it assure a hook position such that the tape is steered to its tip with proper hole alignment for hook-tape engagement. For example, and this modification has been successfully constructed and employed by us, the hook can rise upwardly from the top corner of the positioning weight opposite the tape-approach side of the reel frame, make two sharp, nearly square turns, first in the direction of the tape-approach side of the reel frame and the second downwardly to place its tip in the upper left quadrant of the reel frame, as seen in back view, within the compass of our invention.

Examples of other of the numerous modifications which can be made in the illustrated embodiment of our invention without exceeding its reach are such material substitutions as a light metal, wood, or the like for the Plexiglas of the reel disc (although it is preferred that the disc be transparent to enable the Perforator operator to observe the winding progress of the tape from the front, or operator's, side of the winder); aluminum, or other light metal, for the plastic-impregnated fiber of annulus 35 of pulley 23, etc.; such configurational substitutions as a drum or cushion shape for the flat plate shape of the reel disc, etc.; and such hardware alterations as the substitution of any combination of equivalent parts for spacer sleeve 17, bushing 19, and the various washers shown; the use of several hooks, or one hook with more than one threading tip, for hook 49, etc. The only limit to such modification is that established by the claims and so long as any modified winder is structurally and functionally consistent with the integrity of our invention as taught herein, and lies within the scope of the appended claims, it is a true species of the invention.

In the above connection, we wish to make it clear that the part referred to throughout this specification as a reel disc does not have to be a true disc, and can be of other than circular periphery if desired. Consequently, we will employ the term "reel back-plate" in our claims to generically designate that part. In a related sense, our invention covers the use of a pair of parts, each similar to reel disc 21, spaced parallelly on shaft 13, or its equivalent, with the reel pins extending between and separating them to form a somewhat drum-like reel strucutre. With this arrangement the hook-weight assembly would, of course, be disposed between the two members separated by the reel pins. The reel back-plate, cooperating parallel member (if there is one), or both, may be of spider-like or skeletal, rather than solid plate construction, if desired.

In brief summary, we have shown and described in considerable detail what we believe to be the preferred form of our invention. However, many changes may be made in this form without departing from the broad scope of the invention as defined in the following claims.

We claim:

1. A tape winding device for automatically threading and winding perforated tape, comprising, in combination:

(a) weighted hook means having at least one hook tip;
(b) a shaft;
(c) means securing the weighted hook means to said shaft in freely swinging relationship therearound whereby it is suspended in a fixed position relative to the shaft when the latter is horizontally disposed;
(d) a plurality of reel pins spaced outwardly from and around said shaft;
(e) means maintaining said reel pins in their outwardly spaced orientation, and in orbital relationship, with respect to the axis of the shaft, which means together with the reel pins form a reel structure;
(f) means maintaining said weighted hook means at least partially within said reel structure whereby said reel pins are in peripherally surrounding relationship thereto;
(g) the direction and speed of orbital movement of said reel pins, the positional orientation of said one hook tip on said weighted hook means and the path of inbound tape movement during functioning of the winding device being so correlated that when said device is placed in service the end of the inbound tape enters said reel structure beneath said hook tip and above an orbiting reel pin which thereafter contacts the underside of said tape and conveys it upwardly and into eventual contact with the hook tip, as a result of which the tip slips into a perforation in the tape to hook it and pull it taut over said orbiting reel pin;
(h) the weighted hook means thereafter riding freely around said shaft, pulled by the hooked tape looped over and kept under pulling tension by said orbiting reel pin;
(i) whereby the moving perforated tape is caused to wind around the plurality of reel pins, the end of the tape being held under winding tension by the hook tip caught in its end;
(j) means for receiving energy from a source of same and applying it to said reel structure in such a way as to cause orbiting of said reel pins about the axis of said shaft; and
(k) means for maintaining said device in proper locational and positional orientation relative to the path of said moving perforated tape to receive the tape for threading and winding purposes.

2. A tape winding device for automatically threading and winding perforated tape, comprising, in combination:

(a) hook means having at least one hook tip;
(b) weight means;
(c) means securing said hook means to said weight means;
(d) a shaft;
(e) means securing the resulting hook-weight assembly to said shaft in freely swinging relationship therearound, whereby the weight means holds the hook means in fixed position relative to the shaft when the latter is horizontally disposed;
(f) a plurality of reel pins disposed parallelly around said shaft;
(g) means maintaining said reel pins in their shaft-parallel orientation, and in orbital relationship with respect to the axis of the shaft, which means together with the reel pins form a reel structure;
(h) means maintaining said hook-weight assembly at least partially within said reel structure whereby said reel pins are in peripherally surrounding relationship thereto;
(i) the direction and speed of orbital movement of said reel pins, the positional orientation of said one hook tip on said hook means and the path of inbound tape movement during functioning of the winding device being so correlated that when said device is placed in service the end of the inbound moving tape enters said reel structure beneath said hook tip and above an orbiting reel pin which thereafter contacts the underside of said tape and conveys it upwardly and into eventual contact with the hook tip, as a result of which the tip slips into a perforation in the tape to hook it and pull it taut over said orbiting reel pin;
(j) the hook-weight assembly thereafter riding freely around said shaft, pulled by the hooked tape looped over and kept under pulling tension by said orbiting reel pin;
(k) whereby the moving perforated tape is caused to wind around the plurality of reel pins, the end of the tape being held under winding tension by the hook tip caught in its end;
(l) energy receiving means for receiving motive energy from a source of same and applying it to said reel structure in such a way as to cause orbiting of said reel pins about the axis of said shaft; and
(m) means for maintaining said device in proper locational and positional orientation relative to the path of said moving perforated tape to receive the tape for threading and winding purposes.

3. A tape winding device for automatically threading and winding moving perforated tape, comprising, in combination:

(a) hook means having at least one hook tip;
(b) weight means;
(c) means securing said hook means to said weight means;
(d) a shaft;
(e) means securing the resulting hook-weight assembly to said shaft in freely swinging relationship therearound whereby the weight means holds the hook means in fixed position relative to the shaft when the latter is horizontally disposed;
(f) a plurality of reel pins disposed parallelly around said shaft;
(g) means coactive with the shaft maintaining said reel pins in their shaft parallel orientation whereby the pins orbit the shaft axis when the shaft turns, which means together with the reel pins form a reel structure;
(h) means maintaining said hook-weight assembly at least partially within said reel structure whereby said reel pins are in peripherally surrounding relationship thereto;

(i) the direction and speed of orbital movement of said reel pins, the positional orientation of said one hook tip on said hook means and the path of inbound tape movement during functioning of the winding device being so correlated that when said device is placed in service the end of the inbound moving tape enters said reel structure beneath said hook tip and above an orbiting reel pin which thereatfer contacts the underside of said tape and conveys it upwardly and into eventual contact with the hook tip, as a result of which the tip slips into a perforation in the tape to hook it and pull it taut over said orbiting reel pin;

(j) the hook-weight assembly thereafter riding freely around said shaft, pulled by the hooked tape looped over and kept under pulling tension by said orbiting reel pin;

(k) whereby the moving perforated tape is caused to wind around the plurality of reel pins, the tape being held under winding tension by the hook tip caught in its end;

(l) mechanical energy receiving means for receiving motive power from a source thereof and applying it to said shaft to cause the shaft to turn and the aforesaid reel pins to orbit its axis; and (m) means for maintaining said device in proper locational and positional orientation relative to the path of said moving perforated tape to receive the tape for threading and winding purposes.

4. A tape winding device for automatically threading and winding moving perforated tape, comprising, in combination:

(a) a hook;
(b) a weight;
(c) means securing said hook to said weight;
(d) a shaft;
(e) means securing the resulting hook-weight assembly to said shaft in freely swinging relationship therearound whereby the weight holds the hook in fixed position relative to the shaft when the latter is in horizontally disposed position;
(f) a reel backplate;
(g) means maintaining said reel backplate coactive with and perpendicularly disposed around said shaft;
(h) a plurality of rearwardly extending reel pins secured to said backplate, said pins being so radially distributed on said backplate around said shaft as to describe a common circle upon coaxial rotation of the coactive shaft and backplate, whereby said reel pins and backplate form a reel frame;
(i) means maintaining said hook-weight assembly at least partially within said reel frame whereby said reel pins are in peripherally surrounding relationship thereto;
(j) means for receiving motive power from a source of same and applying it to said shaft to cause it to turn and to cause said reel pins to orbit the axis of said shaft; and
(k) means for maintaining said device in proper locational and positional orientation relative to said moving perforated tape to receive the tape for threading and winding purposes;
(l) the direction and speed of orbital movement of said reel pins, the positional orientation of said hook and the path of inbound tape movement during functioning of the winding device being so correlated that when said device is placed in service the end of the inbound moving tape enters said reel frame beneath the tip of the hook and above an orbiting reel pin which thereafter contacts the underside of said tape and conveys it upwardly and into eventual contact with the tip of said hook, as a result of which said tip slips into a perforation in the tape to hook it and pulls it taut over said orbiting reel pin;
(m) the hook-weight assembly thereafter riding freely around said shaft, pulled by the hooked tape looped over and kept under pulling tension by said orbiting reel pin;
(n) whereby the moving perforated tape is caused to wind around the plurality of reel pins, the tape being held under winding tension by the hook tip caught in its end.

5. The tape winding device of claim 4 in which the hook has a slightly out-turned tip.

6. The tape winding device of claim 1 in which the means for receiving energy from a source of same and applying it to said reel structure comprises;

(a) pulley means mechanically interlinked with said reel structure whereby actuation of the latter with consequent orbiting of said reel pins about the axis of said shaft is effected by pulley rotation of the former;
(b) resilient belt means for drivingly connecting said pulley means with prime mover means whereby motion can be transmitted from the prime mover to said pulley means; and
(c) slip clutch means cooperatively associated with said pulley means whereby abnormally excessive resistance to continued reel pin orbiting motion of the reel structure permits continued pulley means, pulley rotation under driving influence from the prime mover means, through said resilient belt means, under slipping clutch interlinkage with said reel structure whereby no damage occurs to either the involved parts or the perforated tape being wound by the tape winding device.

7. The tape winding device of claim 3 in which the mechanical energy receiving means for receiving motive power from a source thereof and applying it to said shaft comprises:

(o) a pulley comprising a ball bearing encircled by an outer annulus with a groove around its periphery, the inner race of the bearing encircling the shaft in tight fitting relationship;
(p) a resilient power transmission belt adapted to drivingly connect said pulley with a prime mover whereby motive power from the prime mover can be utilized to cause rotation of said shaft and consequent orbiting of said reel pins about the axis thereof; and
(q) a slip clutch operatively associated with the outer annulus of the pulley whereby abnormally excessive resistance to continued rotation of the shaft about its axis permits continued rotation of said outer annulus, under driving influence from the prime mover through the resilient belt, in slipping clutch interlinkage with said shaft.

8. The tape winding device of claim 7 in which the resilient power transmission belt is a neoprene O-ring properly sized to transmit power from a prime mover of periodically pulsing output and to slip in the peripheral groove of said pulley under power surge conditions, whereby a substantially pulseless rotational movement is imparted to said shaft when coupled to an operating prime mover of the aforesaid type through said O-ring.

9. The tape winding device of claim 7 in which the slip clutch comprises a piece of flat spring metal coactively associated with said shaft, said piece of spring metal being so bent and held in position around the shaft as to contact a face of the outer annulus of said pulley with at least a part of its peripheral edge with sufficient force to transmit rotational movement of the pulley to said shaft but not enough force to prevent slippage between the piece of spring metal and the outer annulus of the pulley under abnormal shaft resistance to rotational movement.

10. The tape winding device of claim 7 in which:

(r) the slip clutch comprises a piece of flat spring steel coactively associated with said shaft;

(s) said piece of spring steel being so bent and held in position around the shaft as to contact a face of the outer annulus of said pulley with at least a part of its peripheral edge with sufficient force to transmit rotational movement of the pulley to said shaft but not enough force to prevent slippage between the piece of spring steel and the outer annulus of the pulley under abnormal shaft resistance to rotational movement;

(t) whereby abnormal shaft resistance to rotational movement results in slippage between the piece of spring steel and the outer annulus of the pulley and consequent riding of the latter around the inner race of said ball bearing on the steel balls therebetween.

11. A tape winding device for automatically threading and winding perforated tape, comprising, in combination:

(a) weighted hook means having at least one hook tip;

(b) means adapted to maintain said weighted hook means in freely swinging relationship around a fixed horizontal line;

(c) a plurality of reel pins spaced outwardly from and around said fixed horizontal line when said winding device is in operating position;

(d) means maintaining said reel pins in their outwardly spaced orientation, and in orbital relationship, with respect to said fixed horizontal line when said winding device is in operating position, which means together with the reel pins form a reel structure;

(e) means maintaining said weighted hook means at least partially within said reel structure when said winding device is in operating position, whereby said reel pins are in peripherally surrounding relationship thereto;

(f) the direction and speed of orbital movement of said reel pins, the positional orientation of said one hook tip on said weighted hook means and the path of inbound tape movement during functioning of the winding device being so correlated that when said device is placed in service the end of the inbound tape enters said reel structure beneath said hook tip and above an orbiting reel pin which thereafter contacts the underside of said tape and conveys it upwardly and into eventual contact with the hook tip, as a result of which the tip slips into a perforation in the tape to hook it and pull it taut over said orbiting reel pin;

(g) the weighted hook means thereafter riding freely around said shaft, pulled by the hooked tape looped over and kept under pulling tension by said orbiting reel pin;

(h) whereby the moving perforated tape is caused to wind around the plurality of reel pins, the tape being held under winding tension by the hook tip caught in its end;

(i) means adapted to receive motive energy from a source of same and apply it to said reel structure in operating position in such a way as to cause orbiting of said reel pins about said fixed horizontal line; and (j) means for maintaining said device in proper locational and positional orientation relative to the path of said moving perforated tape to receive the tape for threading and winding purposes.

References Cited by the Examiner

UNITED STATES PATENTS

| | | | |
|---|---|---|---|
| 1,346,356 | 7/1920 | Wenderhold | 242—55.11 |
| 2,509,791 | 5/1950 | Swanson | 242—55.14 |
| 2,991,995 | 7/1961 | Post | 242—74 |
| 3,090,574 | 5/1963 | Doncaster et al. | 242—55.13 |

FRANK J. COHEN, *Primary Examiner.*

G. F. MAUTZ, *Assistant Examiner.*